United States Patent [19]

Lechner

[11] 4,248,558
[45] Feb. 3, 1981

[54] TIE DOWN ANCHOR

[76] Inventor: Ed F. Lechner, 19963 Serrano, Apple Valley, Calif. 92307

[21] Appl. No.: 55,187

[22] Filed: Jul. 6, 1979

[51] Int. Cl.³ .................. B60P 7/06; B61D 45/00; B66J 1/22
[52] U.S. Cl. .................. 410/104; 410/110; 410/115
[58] Field of Search .............. 410/8, 101, 102, 103, 410/104, 105, 106, 107, 108, 109, 110, 111, 112, 113, 114, 115, 116

[56] References Cited

U.S. PATENT DOCUMENTS

| 1,739,893 | 12/1929 | Fedderman | 410/8 |
|---|---|---|---|
| 2,743,684 | 5/1956 | Elsner | 410/105 |
| 3,263,629 | 8/1966 | Higuchi | 410/105 |
| 3,351,356 | 11/1967 | Clark et al. | 410/116 |
| 3,698,678 | 10/1972 | Bowers | 410/105 |

*Primary Examiner*—Howard Beltran
*Attorney, Agent, or Firm*—Brown & Martin

[57] ABSTRACT

A tie down anchor and fastening device includes an elongated continuous channel defining a continuous T-slot with a slider block slidably mounted within the channel and including a connecting member extending through the slot externally of the channel with gripping means carried by the slider block for engagement with the internal walls of the T channel upon tilting or pulling the slider block into engagement with the walls of the channel adjacent the slot.

7 Claims, 6 Drawing Figures

U.S. Patent     Feb. 3, 1981     4,248,558
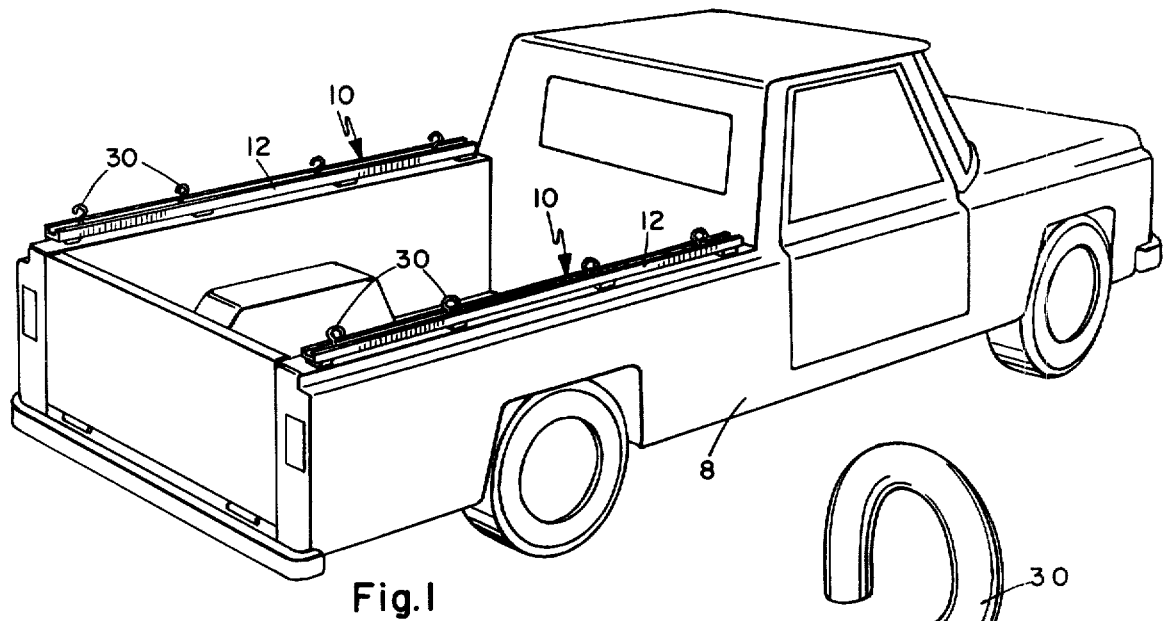
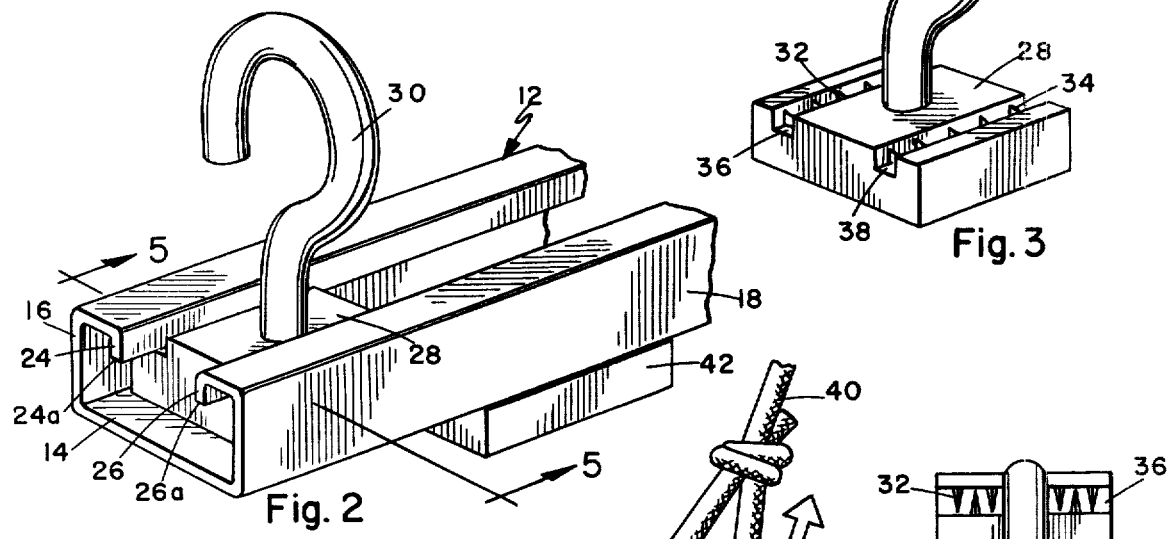

TIE DOWN ANCHOR

BACKGROUND OF THE INVENTION

The present invention relates generally to tie down devices and pertains particularly to a multiple position anchoring device.

Numerous tie down or anchoring devices for tying down cargo and the like for transportation on transport vehicles and the like are known or have been proposed. Many of these known devices are quite satisfactory for certain applications. However, such known devices have a number of drawbacks in certain particular applications.

Examples of the prior known devices of this type are illustrated and disclosed for example, in the following U.S. Patents: U.S. Pat. No. 1,739,893 issued Dec. 17, 1929 to George C. Fedderman and entitled "Hold Down Apparatus For Freight Cars and The Like;" U.S. Pat. No. 2,743,684 issued May 1, 1956 to Elsner entitled "Tie Down Track Fitting;" and U.S. Pat. No. 3,698,678 issued Oct. 17, 1972 to Bowers entitled "Load Holding Device."

Such tie down devices must be rugged and simple in construction and in operation. In many instances, it is desirable to be able to move the fastening device to numerous selectable locations with respect to the cargo or the like. Track type anchoring devices are known and have been proposed for this purpose, as illustrated in the aforementioned patents. Such devices however, are complicated in construction and in utilization.

Accordingly, it is desirable that a simple, inexpensive, and effective track type tie down or anchoring device be available.

SUMMARY AND OBJECTS OF THE INVENTION

It is accordingly the primary object of the present invention to overcome the above problems of the prior art.

Another object of the present invention is to provide a track type tie down device that is easy and simple to manufacture and quick and easy to utilize.

A further object of the present invention is to provide a simple and inexpensive track type tie down device that is rugged and simple and effective to use.

In accordance with the primary aspect of the present invention, a track type tie down device includes a T channel track with a slider block having gripping means and connecting means, with the gripper means automatically engaging and anchoring the device at selected locations along the channel upon application of tension to the connecting means.

BRIEF DESCRIPTION OF THE DRAWING

The above and other objects and advantages of the invention will become apparent from the following description when read in conjunction with the drawings, wherein:

FIG. 1 is a perspective view of a typical pickup vehicle showing the installation of a pair of the tie down anchor units.

FIG. 2 is an enlarged view of a portion of one anchor unit.

FIG. 3 is a perspective view of one slide and hook element.

FIG. 4 is a top plan view of the slide and hook element of FIG. 3.

FIG. 5 is a sectional view taken on line 5—5 of FIG. 2.

FIG. 6 is a sectional view taken on line 6—6 of FIG. 5 showing the jamming action of the slide and hook element under load.

DETAILED DESCRIPTION OF THE PREFERRED EMBODIMENT

Turning now to the drawings, particularly FIG. 1, there is illustrated a cargo vehicle in the form of a pickup truck designated generally by the numeral 8, on which is mounted a pair of tie down anchor assemblies in accordance with the preferred embodiment of the invention, designated generally by the numeral 10. In the illustration of FIG. 1, a pair of anchoring or tie down anchor assemblies in accordance with the invention are mounted, one on each side of the cargo bed of the vehicle. This provides a convenient location for the tying down of anchoring or tie down ropes, straps and the like on such a vehicle. The location of the anchoring assemblies will be selected to suit the particular application.

Turning to FIG. 2, each assembly comprises an elongated channel track 12 of a generally T-slotted square or rectangular cross sectional configuration. As illustrated in FIG. 2, the track 12 includes a base wall 14 having a pair of side walls 16 and 18, each having a generally J-shaped configuration with an upper lateral portion 20 and 22 with a downwardly extending flange 24 and 26 each having an edge 24a and 26a which cooperates with a gripping portion of a slide block as will be described. The length of the channel or track may be selected to suit any desired application.

A slide block 28 having a generally rectangular cross sectional configuration is slidably mounted within the channel of the track member, and includes an anchor or tie down member in the form of an upwardly extending hook 30 which extends through the slot to a position externally of the track member. It is to be understood that this tie down or connecting member may have any suitable configuration, such as a loop, hook or any other suitable form for attachment of anchoring or tie down straps, ropes, chains or the like.

The block and channel may be constructed of any suitable material, but is preferably of a metal such as steel for heavy applications. With normal construction the block and channel will normally have sufficient friction therebetween that the block will have some resistance to movement within the channel. This resistance in combination with an offset form on the block will cause it to tilt into gripping engagement with the channel.

The slide or block member 28 is dimensioned for a fairly close, but loose sliding fit within the channel, as seen for example in FIG. 5, such that when the block is resting on the inner wall of the bottom channel wall 14 the block will slide along the channel, providing the force is applied thereto such that the block will not tilt. Frictional forces between the block and channel will cause tilting of the block when an external force is applied to the block. The block is provided with gripping means 32 and 34 in the form of a plurality of serrations that are in the form for example, of wedge like teeth, extending across channels 36 and 38. The teeth, as will be seen in FIG. 5 and in FIG. 4, extend outward from the respective walls of the channels in which they are formed. This is the preferred form of gripping means and is adapted to cooperate with the edges 24a and 26a defined by the flanges 24 and 26, for jamming or gripping engagement thereof when elevated for preventing sliding movement of the block 28. The engagement is accomplished by a tilting or elevating of the block such that as shown in FIG. 6, the teeth at one end of the block engage the downwardly projecting edges of the flanges 24 and 26.

Any off center force on the hook member 30 will tilt the block as shown in FIG. 6, forcing the teeth into engagement with the edges 24a and 26a of the flanges. Similarly, an upward force on the block will cause the engagement of the teeth with the flanges and thereby prevent sliding movement of the block along the channel. The hook 30 is preferably oriented transverse to the longitudinal axis of the channel for most applications.

The construction of the combination of the block 28 and hook 30 is preferably such that the hook 30 defines or forms a lever arm, which exceeds the length of the lever arm formed by the length of the block beyond the connection of the hook 30 thereto. This is such that a lateral force on the hook member 30 at a distance above the block 28 sufficient to force a movement about the corner of the block will immediately tilt the block forcing it into engagement with the track such that the gripping means will grip the track and prevent movement with the block. Movement of the block is simply accomplished by releasing all force on the connecting member or hook 30, and applying a transverse force along the channel low down on the member 30, closely adjacent the block or slider member.

A force applied toward the upper end of the connecting member 30 results in tilting the slider block such that it immediately engages the channel and prevents movement thereof. Thus, with this arrangement the tie down or anchor members 30 can be selectively positioned an infinite number of positions along the channel. As soon as a force is applied to the hook 30 by means of a tie down strap or rope 40, as in FIG. 6, such that the block 28 is either lifted into engagement with the edges of flanges 24 and 26, or is tilted into engagement, the block remains in its selected position. Tilting of the block in any direction will cause engagement of some of the serrations with edges 24a and 26a.

The channel is preferably mounted on a support or spacer block 42 to space the channel upward from the member on which it is mounted. A counter-sunk screw or bolt would be utilized in a similarly formed countersunk bore 44 for retaining the member in position. Retaining means for retaining the slider blocks or members 28 within the channel may be provided such as a pin or screw extending across the channel at the end thereof. It is apparent from the above description that a block within a channel as proposed will have an infinite number of positions along the length of the channel where it can be anchored. The slide block immediately anchors itself upon the application of a force in any direction on the hook 30 that will either tilt the slide block or pull it toward the slot.

While I have illustrated and described my invention by means of a specific embodiment, it is to be understood that numerous changes and modifications may be made therein without departing from the spirit and scope of the invention, as defined in the appended claims.

I claim:

1. A tie down fastening device comprising:
   an elongated continuous channel defining a continuous T-slot defined by side walls defining an edge directed inward toward the interior of said channel,
   a slider block slidably mounted in and having sufficient clearance to normally slide within said T-slot,
   a fastening member secured to said block and extending through the slot externally of said channel for connecting to tie down straps, and
   gripping means carried by said slider block for gripping said channel member and anchoring said slider when elevated in selected positions along said channel wherein said edge of each of said side walls overlie a portion of the surface of said block, and
   said gripping means comprises serrations formed in said block for engagement with said edges.

2. The fastening device of claim 1 wherein said fastening member defines a lever arm having a length exceeding the length of the block from each end thereof to the connection of the fastening member to the block so that lateral force on said member at least at the outermost end thereof tilts the block into gripping engagement with said edge.

3. The fastening device of claim 1 wherein said serrations are formed in grooves in the upper surface of said slider block.

4. A tie down fastening device comprising:
   an elongated continuous channel defining a continuous T-slot
   a slider block slidably mounted in and having sufficient clearance to normally slide within said T-slot,
   a fastening member secured to said block and extending through the slot externally of said channel for connecting to tie down straps, and
   gripping means comprising serrations on said slider block at each side of the slot and adapted to engage and grip the walls of the channel adjacent the slot upon tilting of said slider in said channel, and pulling of said slider toward said slot for anchoring said slider in selected positions along said channel.

5. The fastening device of claim 4 wherein said fastening member is a hook member having a length exceeding the length of the slider block.

6. The fastening device of claim 5 wherein said hook is oriented transverse to the channel.

7. A tie down fastening device comprising:
   an elongated continuous channel defining a continuous T-slot defined by side walls, each defining an edge directed inward toward the interior of said channel,
   a slider block slidably mounted in and having sufficient clearance to normally slide within said T-slot,
   a fastening member secured to said block and extending through the slot externally of said channel for connecting to tie down straps, and
   gripping means carried by said slider block for gripping said channel member and anchoring said slider when elevated in selected positions along said channel, said gripping means comprises serrations on the surface of said slider block adapted to engage said edges.

* * * * *